Oct. 10, 1961  J. J. TOROK  3,003,287
APPARATUS FOR FORMING GLASS ARTICLES
Filed May 8, 1959  3 Sheets-Sheet 1

INVENTOR.
JULIUS J. TOROK
BY W. A. Schaich &
E. J. Holler
ATTORNEYS

Oct. 10, 1961 J. J. TOROK 3,003,287
APPARATUS FOR FORMING GLASS ARTICLES
Filed May 8, 1959 3 Sheets-Sheet 2

INVENTOR.
JULIUS J. TOROK
BY W. A. Schaich &
E. J. Holler
ATTORNEYS

Oct. 10, 1961 J. J. TOROK 3,003,287
APPARATUS FOR FORMING GLASS ARTICLES
Filed May 8, 1959 3 Sheets-Sheet 3

INVENTOR.
JULIUS J. TOROK
BY W. A. Schaich &
E. J. Holler
ATTORNEYS

United States Patent Office 3,003,287
Patented Oct. 10, 1961

3,003,287
APPARATUS FOR FORMING GLASS ARTICLES
Julius J. Torok, Toledo, Ohio, assignor to Kimble Glass Company, a corporation of Ohio
Filed May 8, 1959, Ser. No. 811,935
24 Claims. (Cl. 49—76)

This invention relates to forming articles and particularly to forming glass articles which have sharp curves connecting portions thereof, such as glass block halves and television tube faces which have a base portion and a flange portion connected to the base portion by relatively sharply curved portions.

One method of making glass articles is to place a gob of hot molten glass in a mold having an internal molding surface corresponding to the external configuration of the article to be formed and moving a plunger into contact with the gob to displace the glass and form the glass article. The plunger has an external molding surface corresponding to the internal configuration of the article which is to be formed. In order to make acceptable articles by such a method, it is necessary to maintain the glass forming surfaces of the plunger and mold at the proper temperature. If the glass forming surfaces are at too high a temperature, the glass has a tendency to stick thereto and if the glass forming surfaces are at too low a temperature the glass will form crizzles or what are commonly known as "chill wrinkles."

When such a method is used in making a glass article which has sharp curves connecting certain portions thereof, such as glass block halves and television tube face plates which comprise a base portion and a flange portion connected to the base portion by relatively sharply curved portions, the problem of maintaining the temperature becomes more difficult since there is a tendency for the glass to be extremely hot in the area of the sharp curves. Efforts to lower the temperature in these areas usually result in a lowering of the temperature of the adjacent areas causing them to be too cold. As a result, in the manufacture of glass block halves and television tube face plates, it has been found that the percentage of rejects is quite high resulting in waste and excessive amount of cullet which must be handled and if possible reused.

It is therefore an object of this invention to provide a method and apparatus for forming glass articles such as glass block halves and television tube face plates wherein the glass forming surfaces do not exceed the limits of working temperatures of the glass; where the apparatus may be constructed at a relatively low cost; and wherein the tendency of the glass to stick or to become crizzled is substantially lessened.

Figure 1:
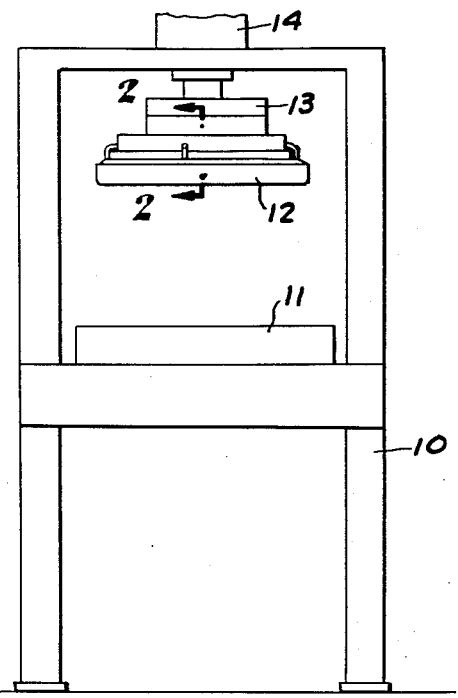
FIG. 1 is an elevation of a molding apparatus embodying the subject invention.

Referring to FIG. 1, a conventional apparatus for forming a glass article such as a glass block half or a television tube face place comprises a base 10 for a mold 11 having an internal molding surface corresponding to the external configuration of the glass article which is to be formed. The apparatus includes a plunger 12 which is adapted to be moved downwardly and upwardly into and out of the mold 11. Plunger 12 is mounted on a head 13 for vertical reciprocating movement by a suitable means such as a hydraulic cylinder 14.

Figure 2:
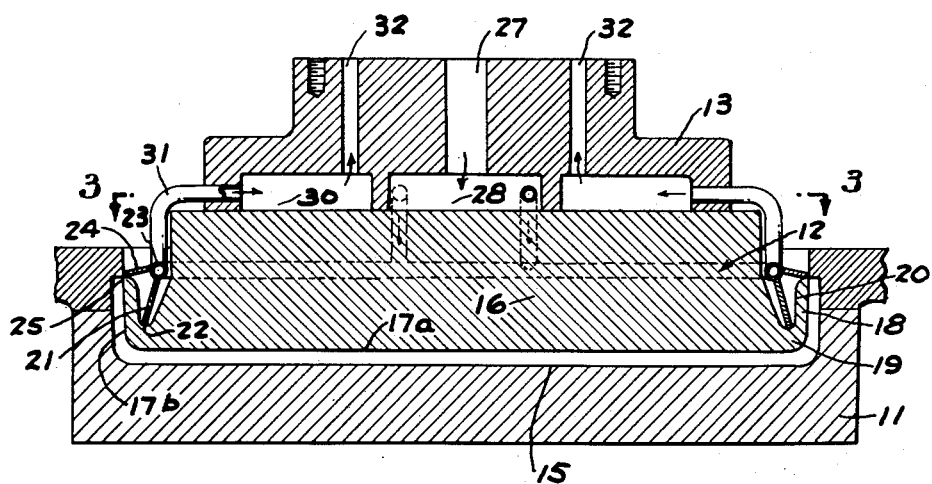
FIG. 2 is a vertical section of a plunger used in the apparatus shown in FIG. 1 taken along the line 2—2.
Figure 3:
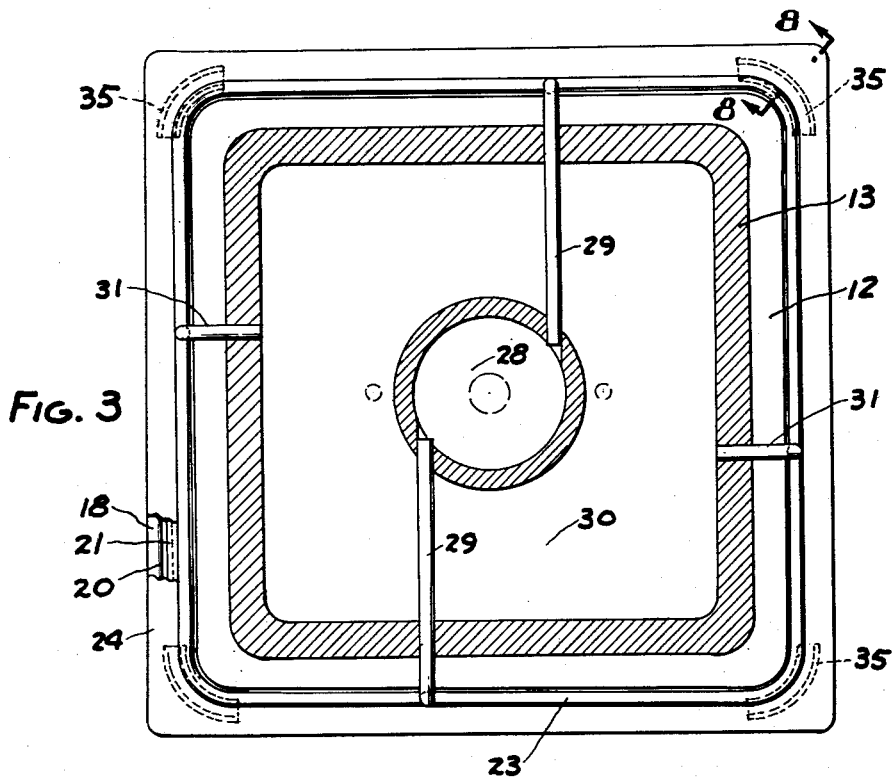
FIG. 3 is a sectional view taken along the line 3—3 in FIG. 2.

As shown in FIG. 2, mold 11 includes a molding surface 15 which has a configuration corresponding to the external configuration of the article which is to be formed. Plunger 12 comprises a base portion 16 which is of substantial uniform thickness throughout. Under surface 17a of base portion 16 corresponds to the configuration of the internal surface of the base portion of the article which is being formed. Plunger 12 also includes a peripheral flange 18 which is connected to base portion 16 by a sharply curved portion 19 so as to form a groove 20 spaced radially inwardly from surface 17b and extending generally axially of the plunger toward curved portion 19. The external surface 17b of flange 18 corresponds to the configuration of the internal surface of the flange of the article which is being formed. The radial thickness of the flange 18 is substantially less than the axial thickness of base portion 16. The external configuration of the plunger 12 corresponds with the shape of the article being formed and may have a round, square or any other cross sectional shape. As shown in FIG. 3, the plunger has a square shape such as might be used in forming glass block halves. The surfaces 15 and 17 of the mold 11 and plunger 12, respectively, may be formed with ribs or other pattern forming shapes which may be required in order to form ribs and prisms on the glass block half to produce the proper direction and control of light.

As shown in FIGS. 2 and 3, an endless strap or plate 21 of highly conductive material has one edge thereof fastened with a thermal bond to the base of the groove 20 as at 22. The other edge of the plate 21 is fixed by thermal bond with a tube 22 of highly conductive material which surrounds the body 16 of the plunger 12 and through which liquid coolant is circulated as presently described. A second endless strap or plate 24 has one edge thereof fixed with a thermal bond to the upper edge of the flange portion as at 25 and the other edge thereof fixed with a thermal bond to the tube 23.

Referring to FIGS. 2 and 3, head 13 is provided with liquid circulating means including a central inlet passage 27 for liquid coolant which extends to a chamber 28 formed between the bottom of head 13 and the top of plunger 12. Inlet conduits 29 of conductive material extend from the chamber 28 to generally diametrically opposed points in the pipe 23. Head 13 is also provided with a discharge chamber 30 surrounding chamber 28. Discharge conduits 31 of conductive material extend from generally diametrically opposed points and provide communication between the chamber 30 and the tube 23. By this arrangement, liquid coolant may be circulated under pressure from means not shown through inlet 27, chamber 28 and inlet conduits 29 to tube 23 and out from the tube 23 through discharge conduits 31 to the chamber 30 and discharge passages 32.

Figure 8:
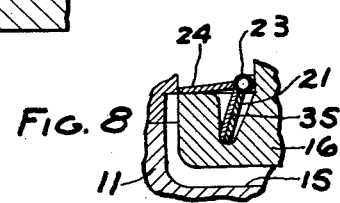
FIG. 8 is a vertical section taken along the line 8—8 in FIG. 3.

The coefficient of thermal conductivity of the first plate 21 is greater than the coefficient of thermal conductivity of the second plate 24 and accordingly a greater quantity of heat is removed through the plate 21 than is removed through the plate 24. For example, plate 21 may be made of copper or copper alloys while plate 24 and plunger 12 may be made of cold rolled steel, or other oxidation resistant alloys such as stainless steel. By this arrangement, it is possible to remove the maximum amount of heat from the area in which the maximum heat occurs so that the surfaces 17a and 17b will be maintained at a substantially uniform or isothermal temperature throughout the operation of the plunger thereby preventing the sticking of the glass or the formation of crizzles in the glass.

Where the article being formed is symmetrical about all vertical planes therethrough and an addition has sharp corners in a horizontal plane, as for example the rectangular article being formed by the plunger shown in FIG. 3, it is necessary to withdraw additional heat at such corners. Accordingly, as shown in FIGS. 3 and 8, additional plates 35 are provided in thermal bond with the groove 20 and the tube 22 at the corners so that additional heat is withdrawn at the corners. Alternatively, the plate 21 may be made thicker in cross section at the corners.

Where the article being formed is not symmetrical about all vertical planes and has sharp corners in a horizontal plane, the additional plate 35 or thickness of plate 21 at the corners is not required because as the gob of glass is pressed the glass is first forced outwardly to the sides and reaches the corners only at the end of the forming cycle and therefore is in contact with the plunger only for a very short period of time.

Figure 4:
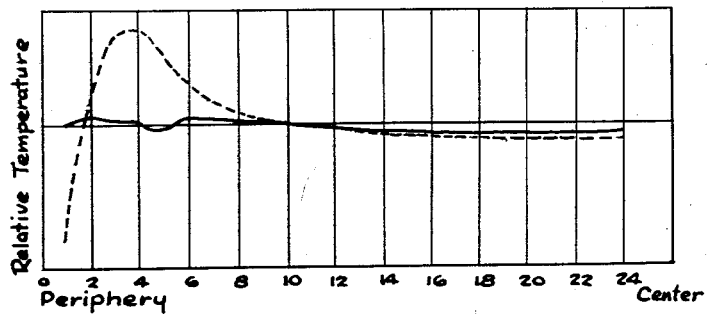
FIG. 4 shows curves of temperature distribution in a plunger embodying the subject invention.

The action of the plunger may be readily understood by referring to the curves shown in FIG. 4 which shows the relative temperature distribution from the center to the periphery of the plunger. The dotted line curve represents the temperature distribution from the center to the periphery of a plunger of conventional type without the use of the conducting plates 21, 24 or the groove 20 and the solid line curve represents the temperature distribution of a plunger embodying the invention. It can readily be seen that the plunger of conventional type has a substantial variation in temperature from the periphery to the center. This limits the temperature variation that can occur. This may be contrasted to the plunger embodying the invention wherein there is a substantially uniform temperature throughout the base portion including the area of juncture so that the plunger has substantially isothermal characteristics.

It can readily be seen that a plunger of conventional construction operates with portions close to the permissible temperatures to which the glass may be operated. That is, some portions operating near the upper limit and other portions operating near the lower limit. Any shift of the temperature curve would cause portions of the glass articles which are being formed to exceed the limit for either sticking or crizzling. On the other hand, the plunger embodying the invention has a relatively small temperature variation and it is possible to have a substantial variation in temperature or shifting of the curve without causing sticking or crizzling. In practice, it would be preferred that the plunger would be operated in the medial zone as shown in FIG. 4. Under certain conditions where surface quality is important, the plunger would be operated near the upper limit. Under other conditions where high speeds are required and surface quality is less important, the plunger might be operated near the lower limit.

In addition to providing a relatively inexpensive manner of making the plungers operated under isothermal conditions, the invention permits the plunger to be made from a single block of metal without intricate casting. In addition, the temperature distribution may be changed at any time during the life of the plunger merely by changing the size of the plates 21, 24; for a given temperature differential, the heat transfer increases with the cross sectional area of the material and decreases with the length of the material.

Figure 5:
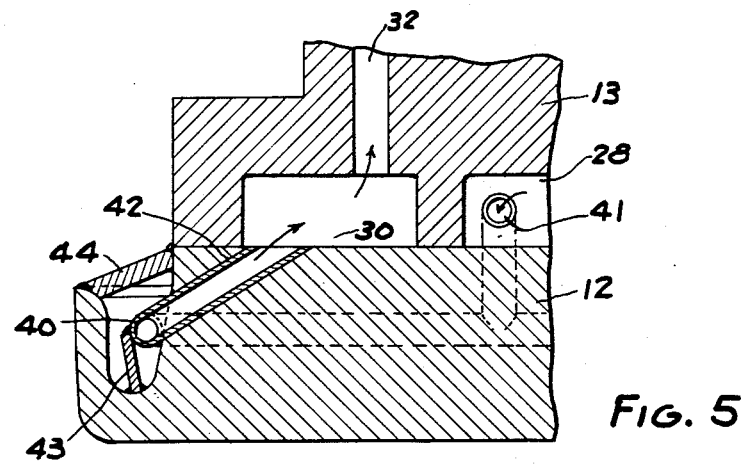
FIG. 5 is a vertical section of a modified form of plunger.
Figure 6:
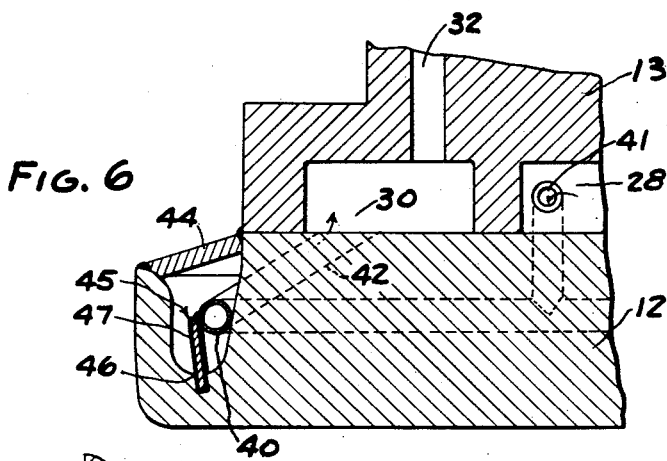
FIG. 6 is a vertical section of a further modified form of a plunger.
Figure 7:
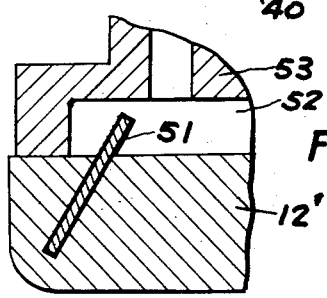
FIG. 7 is a vertical section of a further modified form of plunger.

Modified forms of the invention are shown in FIGS. 5, 6 and 7. As shown in FIG. 5, a tube of conductive material designated 40 is positioned in groove 20 and the inlet conduits 41 and discharge conduits 42 extend through openings in the base 12 of the plunger to the inlet chamber 28 and discharge member 30, respectively. The first plate 43 of highly conductive material has one edge thereof fastened by a thermal bond to the base of the groove and the other edge thereof fastened by a thermal bond to the tube 40 while second plate 44 of highly conductive material, less conductive than plate 43, has one edge thereof fastened by a thermal bond to the upper edge of flange 18 and the other edge fastened by a thermal bond to the upper portion of base 12. In all other respects the structure is the same. Plate 43 has a greater rate of thermal conductivity than plate 44. This structure has an additional advantage in that second plate 44 completely isolates tube 40 and plate 43 from the atmosphere and provides an inert atmosphere around these members. Since these members are made of a material which is highly conductive such as copper and which may be more readily subject to deterioration and oxidation, this arrangement tends to protect these members and prolongs their life.

In the form of the invention shown in FIG. 6, first plate member 45 is in the form of a clad strap and is cast in situ in the plunger 12. Clad strap 45 comprises a plate 46 of highly conductive material such as copper which has a melting point less than the melting point of the material comprising plunger 12. Plate 46 is clad with a material of higher melting point such as nickel so that it can be inserted and held in place during the casting of plunger 12. After casting, there is a metallurgical bond between the plate 46, cladding 47 and plunger 12. This greatly facilitates the manufacture and the positioning of the strap 45 and insures a proper thermal bond between the edge of strap 45 and the base of the groove.

A typical example of the structure shown in FIG. 6 is wherein the strap 46 is made of copper, the cladding is nickel, and the plunger 12 is made of cold rolled steel.

In the form of the invention shown in FIG. 7, the plunger 12′ comprises a block of metal which is of substantial uniform thickness throughout and the clad strap 51 is cast in situ in the plunger 12′ and extends from an area adjacent the corner of the plunger to the chamber 52 in the head 53 through which water is circulated in order to cool the plunger. In this form of the invention, the clad strap 51 is made of materials similar to that of the strap 45 in FIG. 6 so that the strap may be cast in situ in the plunger 12′.

The terms "thermal bond" and "fixed with a thermal bond" as used herein are intended to describe the nature of the bond between the plates and the plunger and tube, respectively, and should be of such character that the best possible thermal conductivity is obtained between the respective parts. There should be no significant interfacial temperature drop between the parts. Such a bond is usually obtained by a metallurgical bond such as in a good braze or weld wherein there is negligible interfacial thermal drop. Such a bond is also obtained by casting the clad strap in situ in the plunger as in the forms of the plunger shown in FIGS. 6 and 7.

I claim:

1. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a pair of molding surfaces connected by a surface of relatively sharp radius, the improvement wherein said plunger includes a first plate of conductive material with one edge thereof having a thermal bond with the plunger on the side opposite the molding surface adjacent the area of juncture of said two surfaces, and means adjacent the other edge of said plate and adapted to cool said edge thereby removing heat by conduction through said plate, the coefficient of thermal conductivity of said plate being greater than the coefficient of thermal conductivity of said plunger.

2. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a pair of molding surfaces connected by a surface of relatively sharp radius, the improvement wherein said plunger includes a first plate of conductive material with one edge thereof having a thermal bond with the plunger on the side opposite the molding surface adjacent the area of juncture of said two surfaces, said plate being continuous and extending generally around the periphery of said plunger, and means adjacent the other edge of said plate and adapted to cool said edge thereby removing heat by conduction through said plate, the coefficient of thermal conductivity of said plate being greater than the coefficient of thermal conductivity of said plunger.

3. The combination set forth in claim 2 wherein said plunger has at least one area of one of said surfaces having a lesser radius than the adjacent areas of said surface, said plate having a greater thickness at said area than at the adjacent areas.

4. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a pair of molding surfaces connected by a surface of relatively sharp radius, the improvement wherein said plunger includes a first plate of conductive material with one edge thereof having a thermal bond with the plunger on the side opposite the molding surface adjacent the area of juncture of said two surfaces, a second plate of conductive material having one edge thereof having a thermal bond with another portion of one of said surfaces, and means fixed to the other edges of said plates and adapted to be cooled by the circulation of a coolant for removing heat by conduction through said plates, the coefficient of thermal conductivity of said first plate being greater than the coefficient of thermal conductivity of said plunger and of said second plate.

5. The combination set forth in claim 4 wherein said means for removing heat from the other edges of said plates comprises a tube to which said plates are thermally bonded at said other edges, said tube being adapted to have coolant circulated therethrough.

6. In an apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement including a first plate of conducting material thermally bonded along one edge to the surface of the plunger opposite the molding surface at the area of juncture of said base portion and flange portion, a second plate thermally bonded along one edge with the upper edge of the flange portion of the plunger, and means thermally bonded to the other edges of said plates and adapted to be cooled by the flow of coolant for removing heat through said plates, the coefficient of thermal conductivity of said first plate being greater than the coefficient of thermal conductivity of said plunger and of said second plate.

7. In an apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement wherein said plunger comprises a body defining said base portion and a peripheral flange on said body defining said flange portion, said plunger being formed with a peripheral generally axially extending groove on the side thereof opposite the molding surfaces of the base portion and flange portion and spaced radially inwardly from the outer surface of the flange portion, said groove extending toward the area of juncture of the flange portion and base portion, a first plate of conducting material thermally bonded along one edge to the base of said groove and extending outwardly therefrom, a second plate thermally bonded along one edge with the upper edge of the flange portion of said plunger, and means thermally bonded to the other edges of said plates and adapted to be cooled by the flow of coolant for removing heat through said plates, the coefficient of thermal conductivity of said first plate being greater than the coefficients of thermal conductivity of said plunger and of said second plate.

8. The combination set forth in claim 7 wherein said last mentioned means comprises a tube of conductive material through which liquid coolant is circulated, the other edges of said plates being fixed to said tubes.

9. The combination set forth in claim 7 wherein said plunger has at least one area of said flange portion having a lesser radius than the adjacent areas, said plate having a greater thickness at said area than at the adjacent areas of said flange portion.

10. In an apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement wherein said base portion of said plunger is of substantially uniform axial thickness throughout, said flange portion having a lesser radial thickness than the axial thickness of said base portion and being separated therefrom by a generally axially extending groove which extends to the area of juncture of the base portion and flange portion, a tube of conductive material surrounding the base portion of said plunger, means for circulating liquid coolant through said tube, a first continuous plate positioned in said groove and having one edge thereof thermally bonded with the base of said groove and the other edge thereof thermally bonded to said tube, and a second continuous plate of conductive material having one edge thermally bonded to the upper edge of the flange portion of the plunger and the other edge thereof thermally bonded to said tube, the coefficient of thermal conductivity of said first plate being greater than the coefficient of thermal conductivity of said second plate.

11. The combination set forth in claim 10 wherein said plunger is made of cold-rolled steel, said first plate is made of copper, and said second plate is made of cold-rolled steel.

12. The combination set forth in claim 10 wherein said plunger is made of stainless steel, said first plate is made of copper, and said second plate is made of cold-rolled steel.

13. In an apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement wherein said base portion of said plunger is of substantially uniform axial thickness throughout, said flange portion having a lesser radial thickness than the axial thickness of said base portion and being separated therefrom by a generally axially extending groove which extends to the area of juncture of the base portion and flange portion, a continuous tube of conductive material surrounding the base portion of said plunger, means for circulating liquid coolant through said tube, a first continuous plate positioned in said groove and having one edge thereof thermally bonded to the base of said groove and the other edge thereof thermally bonded to said tube, a second continuous plate having one edge thereof thermally bonded to the upper edge of said flange portion of the plunger and the other edge thereof thermally bonded to the body of the base portion of the plunger, the coefficient of thermal conductivity of said first plate being greater than the coefficient of thermal conductivity of said second plate.

14. The combination set forth in claim 13 wherein said second plate completely encloses said tube and said first plate and isolates the tube and first plate from the atmosphere.

15. The combination set forth in claim 13 wherein said means for circulating liquid coolant through said tube comprises a distributor head mounted on said plunger and adapted to be moved with said plunger, means for directing liquid coolant to said head, means for removing liquid coolant from said head, said plunger having means associated therewith including inlet and outlet passages extending from the periphery of said plunger adjacent said head to said tube.

16. The combination set forth in claim 13 wherein said plunger is made of cold-rolled steel, said first plate is made of copper, said second plate is made of cold-rolled steel and said tube is made of copper.

17. The combination set forth in claim 13 wherein said plunger is made of stainless steel, said first plate is made of copper, said second plate is made of cold-rolled steel, and said tube is made of copper.

18. The combination set forth in claim 13 wherein said plunger is a casting and said first plate is cast in situ in said plunger.

19. The combination set forth in claim 13 wherein said plunger is a casting, said first plate comprising a material having a melting point less than the melting point of the material comprising the plunger, said plate being clad with a material having a melting point higher than the melting point of the material comprising the plunger, said clad plate being cast in situ in said plunger.

20. The combination set forth in claim 19 wherein said first plate comprises copper clad with nickel.

21. In an apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement wherein said plunger is a casting and includes base portion of said plunger which is of substantially uniform thickness throughout, a continuous plate extending along the periphery of said plunger and being cast in situ in said plunger, said plate extending upwardly and inwardly and having a portion thereof extending beyond the top of said plunger, and means providing a chamber above said plunger through which cooling liquid is adapted to be circulated for cooling the upper portion of said plunger and removing heat through the upper edge of said plate.

22. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a pair of molding surfaces connected by a surface of relatively sharp radius, the improvement wherein said plunger includes a first plate of conductive material with one edge thereof having a thermal bond with the plunger on the side opposite the molding surface adjacent the area of juncture of said pair of surfaces, a second plate of conductive material having one edge thereof having a thermal bond with another portion of one of said surfaces, and means for removing heat from said other edges of said plates comprising a tube, the other edge of said first plate having a thermal bond with said tube, the other edge of said second plate having a thermal bond with the body of said plunger, and means for cooling the body of said plunger, the coefficient of thermal conductivity of said first plate being greater than the coefficients of thermal conductivity of said plunger and of said second plate.

23. An apparatus for forming a glass article by pressing a plunger into contact with a gob of glass placed in a mold having an internal molding surface corresponding to the external configuration of the article which is to be formed, said plunger having an external molding surface corresponding to the internal configuration of the article which is to be formed and comprising a base portion and the flange portion extending upwardly from the periphery of the base portion, the improvement wherein said plunger comprises a body defining said base portion and a peripheral flange on said body defining said flange portion, said plunger being formed with a peripheral generally axially extending groove on the side thereof opposite the molding surfaces of the base portion and flange portion and spaced radially inwardly from outer surface of the flange portion, said groove extending toward the area of juncture of the flange portion and base portion, a first plate of conducting material thermally bonded along one edge to the base of said groove and extending outwardly therefrom, a second plate thermally bonded along one edge with the upper edge of the flange portion of said plunger, and means comprising a tube through which liquid coolant is adapted to be circulated, the other edge of said first plate being thermally bonded to said tube, the other edge of said second plate being thermally bonded to the body of the plunger, the coefficient of thermal conductivity of said first plate being greater than the coefficients of thermal conductivity of said plunger and of said second plate.

24. The combination set forth in claim 23, wherein said tube lies entirely in said groove, said second plate completely enclosing said tube in said groove.

References Cited in the file of this patent

UNITED STATES PATENTS

| 780,863 | Coleman | Jan. 14, 1905 |
| 1,717,643 | Williams | June 18, 1929 |
| 2,304,664 | Smith | Dec. 8, 1942 |